United States Patent
Hobelsberger

(10) Patent No.: US 9,695,032 B2
(45) Date of Patent: Jul. 4, 2017

(54) FILLING DEVICE WITH ADJUSTABLE ANGLE OF APPLICATION

(71) Applicant: Bayerische Motoren Werke Aktiengesellschaft, Munich (DE)

(72) Inventor: Stefan Hobelsberger, Neufahrn (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/710,752

(22) Filed: May 13, 2015

(65) Prior Publication Data

US 2015/0239727 A1   Aug. 27, 2015

Related U.S. Application Data

(63) Continuation of application No. PCT/EP2013/072258, filed on Oct. 24, 2013.

(30) Foreign Application Priority Data

Nov. 20, 2012   (DE) .................. 10 2012 221 175

(51) Int. Cl.
  *B29C 39/18* (2006.01)
  *B67D 7/06* (2010.01)
  *B29C 39/24* (2006.01)
  *B29C 67/24* (2006.01)

(52) U.S. Cl.
  CPC .............. *B67D 7/06* (2013.01); *B29C 39/18* (2013.01); *B29C 39/24* (2013.01); *B29C 67/246* (2013.01)

(58) Field of Classification Search
  CPC ........... B67D 7/06; B29C 39/18; B29C 39/24; B29C 67/246

USPC ............... 141/9, 105, 107, 285–286, 392
See application file for complete search history.

(56) References Cited

U.S. PATENT DOCUMENTS

| | | | | |
|---|---|---|---|---|
| 816,897 A | * | 4/1906 | Bray | A01D 87/0046 239/508 |
| 4,165,211 A | | 8/1979 | Ebeling et al. | |
| 4,327,867 A | * | 5/1982 | Jones | E03C 1/08 239/214.23 |
| 4,407,431 A | * | 10/1983 | Hutter, III | B01F 3/088 141/107 |

(Continued)

FOREIGN PATENT DOCUMENTS

| CN | 1083763 A | 3/1994 |
|---|---|---|
| CN | 2621822 Y | 6/2004 |

(Continued)

OTHER PUBLICATIONS

International Search Report (PCT/ISA/210) dated Jun. 2, 2014 with English translation (five pages).

(Continued)

*Primary Examiner* — Nicolas A Arnett
(74) *Attorney, Agent, or Firm* — Crowell & Moring LLP

(57) ABSTRACT

A filling device adapted for wetting or filling a component provided with an undercut, includes a mixing head for mixing a flowable, curable, filler and an outlet tube for feeding the flowable filler to or into a filling space in the component. An adjustable deflecting unit for changing the direction of flow F of the flowable filler is provided such that the filler emerging from the outlet tube can be deflected into an intended direction of flow.

11 Claims, 2 Drawing Sheets

(56) References Cited

U.S. PATENT DOCUMENTS

| | | | | |
|---|---|---|---|---|
| 5,720,324 | A * | 2/1998 | Vinciarelli | B29C 39/08 141/1 |
| 7,628,183 | B2 * | 12/2009 | Dorsch | B01D 19/02 141/285 |
| 7,717,297 | B2 * | 5/2010 | Kadyk | B01F 3/0861 222/129.1 |
| 7,789,273 | B2 * | 9/2010 | Kadyk | B01F 3/0861 222/129.1 |
| 8,622,250 | B2 * | 1/2014 | Kadyk | B01F 3/0861 222/129.1 |
| 8,887,958 | B2 * | 11/2014 | Kadyk | B01F 3/0865 222/129.1 |
| 2005/0011439 | A1 * | 1/2005 | Gueggi | B05C 5/008 118/402 |
| 2007/0068597 | A1 * | 3/2007 | Dorsch | B01D 19/02 141/286 |
| 2007/0137563 | A1 | 6/2007 | Schweizer et al. | |
| 2010/0227073 | A1 | 9/2010 | Frank et al. | |

FOREIGN PATENT DOCUMENTS

| | | |
|---|---|---|
| CN | 201849819 U | 6/2011 |
| CN | 201855769 U | 6/2011 |
| CN | 102333624 A | 1/2012 |
| DE | 26 10 396 A1 | 9/1977 |
| DE | 296 13 762 U1 | 12/1996 |
| EP | 0 057 465 A2 | 8/1982 |
| EP | 0 773 905 B1 | 1/2003 |
| EP | 2 474 368 A1 | 7/2012 |
| WO | WO 93/25778 A1 | 12/1993 |
| WO | WO 03/049870 A1 | 6/2003 |

OTHER PUBLICATIONS

German Search Report dated Aug. 14, 2013 with partial English translation (10 pages).

Rodrigo Coimbra "Applicador de silicone cnc", http://www.youtube.com/watch?v=8QE1EgzkvvQ, Dec. 12, 2008, (one page).

Chinese Office Action issued in counterpart Chinese Application No. 201380046467.3 dated Mar. 9, 2016 with English translation (16 pages).

* cited by examiner

FILLING DEVICE WITH ADJUSTABLE ANGLE OF APPLICATION

CROSS REFERENCE TO RELATED APPLICATIONS

This application is a continuation of PCT International Application No. PCT/EP2013/072258, filed Oct. 24, 2013, which claims priority under 35 U.S.C. §119 from German Patent Application No. 10 2012 221 175.6, filed Nov. 20, 2012, the entire disclosures of which are herein expressly incorporated by reference.

BACKGROUND AND SUMMARY OF THE INVENTION

The present invention relates to a filling device adapted for wetting and/or filling a component provided with an undercut, as well as to a method of filling and/or backfilling the component with a flowable filler.

More particularly, the present invention relates to a filling device which is adapted for filling, backfilling or wetting a component provided with an undercut, where the angle of application and, therefore, the flowing direction of the filler can be adjusted by way of a deflecting unit. The present invention further relates to a method of filling and backfilling a component having an undercut with a flowable filler, where the filling of the area having the undercut takes place by way of a deflecting unit which is adjustable with respect to the angle of application. The invention can naturally also be used on components which have a different (not undercut) geometry.

In the prior art, different fields of application of filling devices are known which guide a flowable filler into a component or receptacle. Various industries use a variety of methods for filling their products and goods with PUR foam or the like. For example, to mention just a few application examples, the filling with a flowable filler is used in the packaging industry in order to fill boxes, cardboard boxes, vessels, cans, tubes and packages.

Another typical use for a filling device is found in the automotive industry such as for interior component parts in an automobile. Many of the products are shaped, for example, by means of a deep-drawing process and are additionally filled or backfilled with a PUR foam or a filler. For reasons of stability and assembly, diverse basic shapes require a foaming process in which the cavities are completely filled, for example, by use of a polyurethane foam.

Particular problems arise when viscous material is used as the filler. When a viscous or generally flowable filler is metered into a component, air may, for example, be enclosed in cavities, which results either in an insufficient filling of the component or simply in a rejecting of the merchandise. For example, when voids or cavities are produced in undercuts, which were insufficiently filled with filler, the component to be filled, for example, an instrument panel, will not be provided with the required stability or the latter may collapse or be dented at the concerned location.

Furthermore, process-caused difficulties may occur because, in the event of an insufficient filling of a component, it cannot be excluded that the filler may overflow and, in addition, the filling device may be soiled. These circumstances are particularly significant in the case of viscous materials since, as a result of their relatively high surface tension, these fillers have a tendency to adhere to one another, and to stay glued to the filling device with which they come in contact.

It is also difficult to completely or sufficiently fill and/or wet geometric shapes that are to be to be filled having undercuts, particularly those which have undercuts with areas that are difficult to reach. From the prior art, methods are known, for example, where the filling device is equipped with a nozzle that can be moved back and forth in order to better be able to fill possibly different filling levels. Thus, European Patent Document EP 0773905 B1 illustrates a filling device having a nozzle that can be moved back and forth.

From German Patent document DE A-2610396, a device is known for the metered filling of a particular highly viscous paste from a storage vessel into a cylinder-shaped filling vessel by means of a measuring cylinder connected with the storage vessel by way of a feeding pipe. The paste is introduced into the measuring cylinder under pressure by way of a multiple spigot, and a measuring piston, which has a measuring piston rod and can be moved in the measuring cylinder. The measuring piston, after the switching of the two-way spigot, presses the paste, which was metered and filled in the measuring cylinder determining the filling volume, by way of a delivery pipe into the filling vessel.

Furthermore, in the prior art, methods are known wherein a filling device has an outlet tube from which filler runs into the component to be filled. These devices known from the prior art have the disadvantage that undercuts and areas that are difficult to reach, in the case of complex component geometries, are not sufficiently wetted or filled by filler exiting from the outlet tube. As a rule, the flowable filler runs perpendicularly, thus in the vertical direction, out of a mixing head provided at the filling device. In this case, turning the outlet nozzle or the outlet tube in the desired direction presents a problem because, for example, in the case of an automated production, depending on the application case, degrees of axial freedom are not sufficiently available for rotating and moving the mixing head or, for example, because of its geometry, the mixing head cannot be swiveled into the desired position.

Particularly with respect to robots increasingly used in the automobile industry, the problem has to be solved that, as a result of geometrical limits and limited axial degrees of freedom, a robot-operated filling device can be used only inadequately or not at all for complex components.

It is therefore an object of the invention to provide a filling device and a method, which overcome the above-mentioned disadvantages and, in particular, are suitable for wetting and/or filling a component provided with an undercut with a flowable filler according to a requirement.

This and other objects are achieved by a filling device according to the present invention. It is the basic idea of the present invention to provide a filling device which has an adjustable deflecting unit for changing the direction of flow of the flowable filler at the mixing head, preferably adjacent to the outlet tube of the flowable filler, so that the filler released from the outlet tube can be deflected into an intended direction of flow and can be directed particularly into areas having undercuts.

According to the invention, a filling device is therefore provided which is adapted for wetting and/or filling a component provided with an undercut, the filling device having a mixing head for mixing a flowable, particularly curable filler, as well as having an outlet tube at the mixing head for feeding the flowable filler to or into a filling space of the component, and further having an adjustable deflecting unit for changing the outflow direction F into a direction of flow F' deviating therefrom. As a result, it is achieved that the filler material exiting from the outlet tube 4 can be deflected into an intended direction of flow F'. In a simplest embodiment, an adjustable deflecting unit can therefore be mounted below the outlet tube 4, from which the flowable filler exits, by means of which deflecting unit, the direction of flow of the filler can be influenced. In this manner, the delivery angle of the filler at the mixing head can be adjusted and, by way of the deflecting unit, filler can thereby be directed to areas provided with undercuts or to cavities. According to the invention, the component can therefore be filled by way of the adjustable deflecting unit. This can advantageously take place without any moving of the mixing head relative to the component.

In a preferred embodiment of the invention, the filling device may be constructed such that the adjustable deflecting unit is arranged below the outlet tube. It is thereby ensured that the flowable filler directly flowing out of the outlet tube can be directed to the desired filling space during the curing period without any special constructive measures. Typical process times for applying and filling are in the range of a few seconds to approximately one minute.

The filling device is preferably provided with an adjusting device on which the deflecting unit is arranged, in order to be able to adjust the orientation of the deflecting unit in one or more spatial directions. Particularly preferably, the adjusting device may be set by way of a control unit as a function of the position of the outlet tube relative to the space to be filled as intended in its orientation. In this manner, without any movement of the filling device with respect to the component, the direction of flow F of the flowable filler can take place to a desired location.

In a particularly preferred embodiment, the adjusting device is constructed such that the deflecting unit, preferably directly fastened to the latter, can be adjusted by rotating or swiveling about an angle of rotation α. As a result, it is ensured that the deflecting unit can distribute the flowable filler in the plane, for example, by rotating about a defined angle α. The mixing head can preferably also be moved in one or more spatial axes, so that, as a result of the combination of axial and rotating movements, complex component geometries can also be filled.

It is further preferred that at least one servo motor be coupled with the adjusting device in order to be able to implement the deflecting device and thereby the deflection of the filler jet in one or more spatial directions, F, F', F'''.

In particular, it is preferable for the deflecting unit to be able to be positioned in an arbitrary orientation with respect to the outlet tube, so that also complex component geometries can be filled by way of a static mixing head (i.e. a mixing head that cannot be moved back and forth). It is particularly preferable for the adjusting devices to be controllable by way of high-speed servo motors via a control unit.

In a particularly preferred embodiment, the surface of the deflecting unit has an anti-adhesion layer. In this case, the deflecting unit may be completely or partially coated with the anti-adhesion layer. The anti-adhesion layer should be designed such that the anti-adhesion effect is present with respect to the flowable filler. In this respect, exchangeable deflecting units may be provided which are equipped with different anti-adhesion layers, depending on which filler is used. If the deflecting unit is covered by an anti-adhesion layer in the entire exposed area with which it comes in contact with the flowable filler, a cleaning device can additionally be provided at the filling device in order to remove excessive residues of adhering filler from the deflecting unit at regular intervals. Such a cleaning may, for example, take place inline by use of a cleaning solvent from a solvent nozzle or by use of compressed-air cleaning This means that a cleaning operation can be carried out without removing the deflecting unit.

In a particularly preferred embodiment, the filling device is adapted for use with flowable PUR foam (polyurethane) as the filler.

In a further advantageous embodiment, the filling device is characterized in that the anti-adhesion layer at the deflecting unit is constructed either as a Teflon layer or as a PP layer. Teflon has an anti-adhesion effect with respect to various fillers and adhesives.

The invention further provides a method of filling and/or backfilling a component provided with an undercut with a flowable filler by using the above-described filling devices.

According to the invention, at least the following process steps are carried out:

(a) providing a component with an undercut for filling and/or backfilling with a flowable curable filler;

(b) feeding filler to the component through the outlet tube; and (c) adjusting the deflecting unit before and/or during the filling of a component such that the filler flowing out of the mixing head is deflected in its direction of flow F by the deflecting unit into a direction of flow F' such that the filler flows into the area having the undercut and fills this area as intended.

Advantageously, the method according to the invention is carried out in an automated manner. The adjusting of the deflecting unit is implemented by an adjusting device which can be set by a servomotor, which adjusting device is coupled with the deflecting unit, whereby the adjusting device or the deflecting unit coupled thereto can be set in its orientation in an automated manner.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
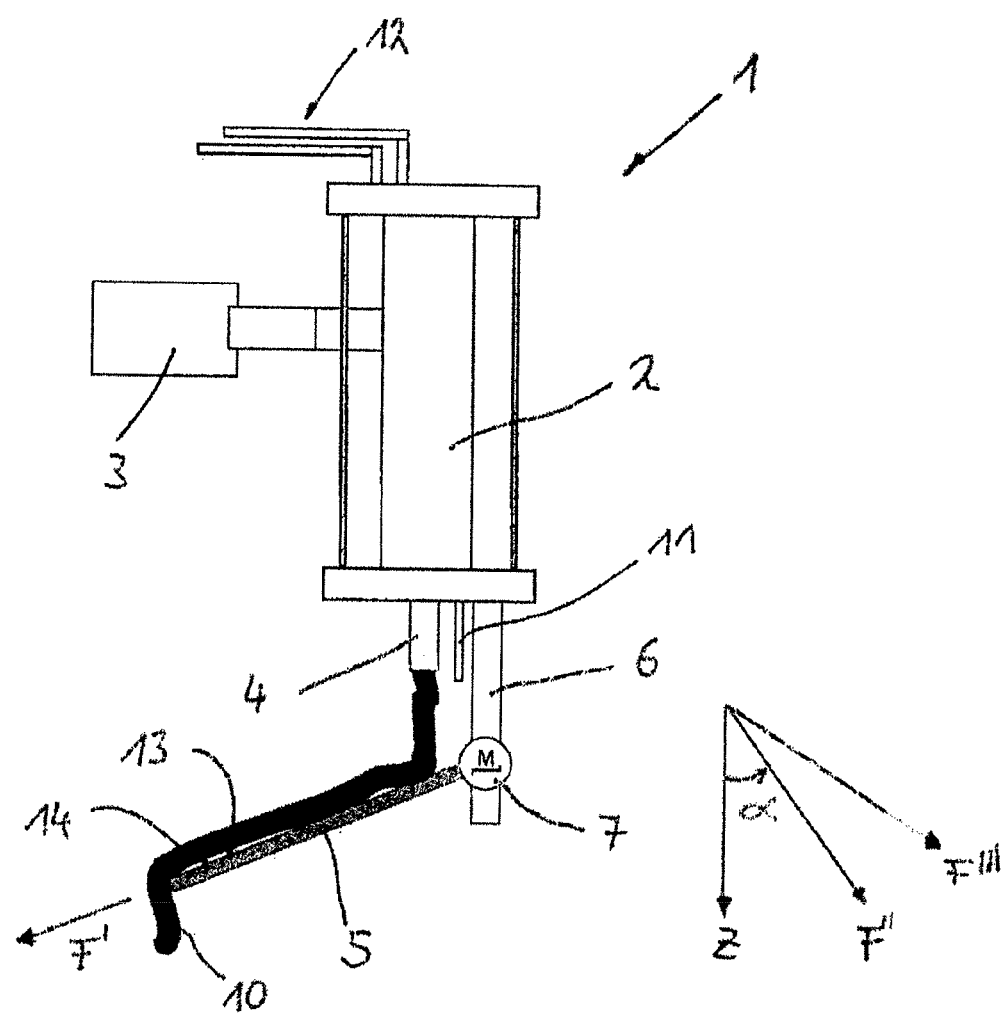
FIG. 1 is a schematic side view diagram of a filling device according to an embodiment of the invention.

FIG. 1 is a schematic view of an embodiment of a filling device 1 according to the present invention. The filling device 1 has a mixing head 2. An operating unit 3 is arranged at the mixing head 2, which operating unit 3 is constructed such that it conveys the flowable filler material 10 from the mixing head 2 to the outlet tube 4 mounted at the bottom of the mixing head 2. The operating unit 3 further has a closing mechanism which prevents or permits the flowing of filler 10 out of the mixing head 2. Feeding tubes 12 are provided at the mixing head 2 for delivering either filler components or additives. The embodiment described here illustrates an arrangement of feeding tubes 12, of the operating unit 3 and an implementation of the mixing head 2, only as an example.

The outlet tube 4, from which flowable, preferably curable, filler material 10 can be applied, is situated at the mixing head 2. The flowable filler material 10 flows out of the outlet tube as a result of its viscosity. The deflecting unit 5 is situated below the outlet tube 4. The deflecting unit 5 is oriented in a spatial direction F', so that the jet of flowable filler material 10 will be deflected by way of the deflecting unit 5 from the vertical direction Z into the direction of flow F'. In the present embodiment, the deflecting unit has an anti-adhesion layer 14 on its surface 13. By means of the anti-adhesion layer 14, the adhering of the flowable filler 10 to the deflecting unit 5 can be largely or completely avoided.

The deflecting unit 5 is connected with an adjusting device 6. The adjusting device 6 can adjust the orientation of the deflecting unit 5. In particular, the adjusting device 6 is constructed such that the orientation of the deflecting unit 5 can take place in one or more spatial directions F', F'', F''', as indicated for example by the directional arrows in FIG. 1. In this case, the deflecting unit 5 is coupled with the adjusting device 6 by way of a servo motor 7, so that the deflecting unit 5 can be swiveled about the polar angle α by the servo motor.

Figure 2:
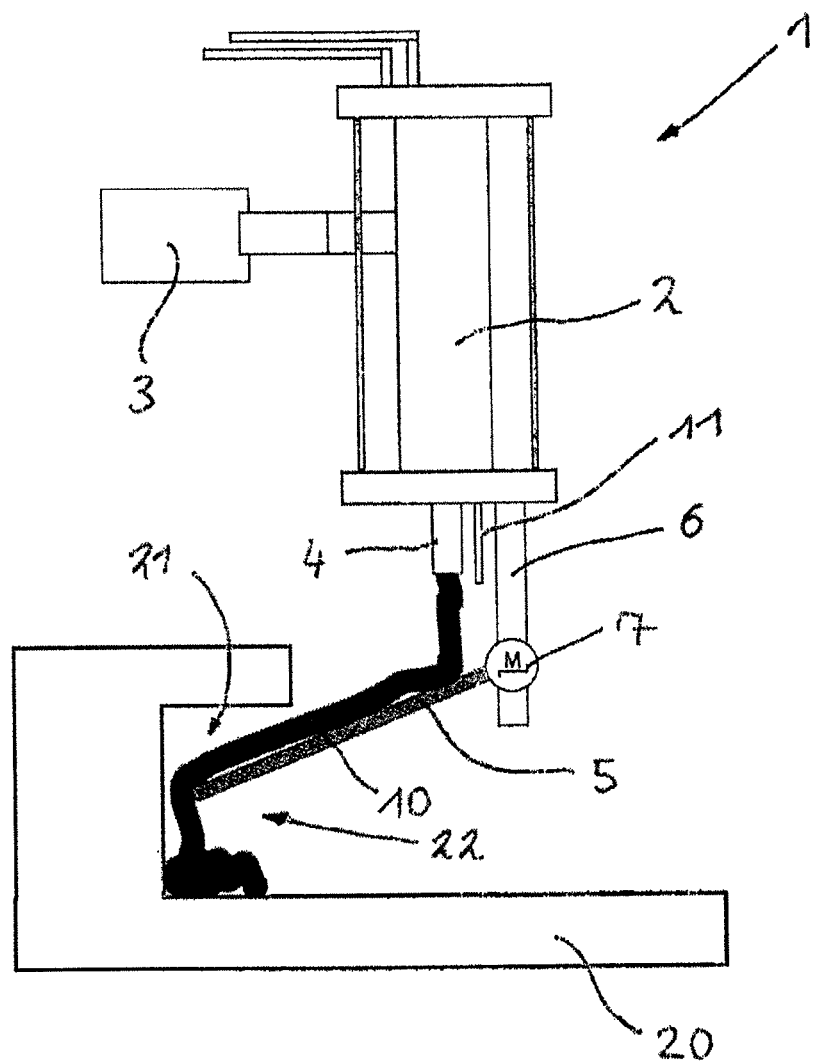
FIG. 2 is a view similar to that of FIG. 1, in which the filling of a component is explained.

FIG. 2 illustrates the filling device 1 and the process steps connected therewith when filling a component 20 provided with an undercut 21.

Identical reference numbers in FIG. 2 indicate the same components as were indicated in the description of FIG. 1.

A part of a component 20, such as a part of an instrument panel for a motor vehicle, is situated below the filling device 1. The component 20 has an undercut 21, which forms a filling space 22, which is to be backfilled with a polyurethane foam, as intended. As illustrated in FIG. 2, it becomes possible as a result of the solution according to the invention that the filler 10 flowing out in the vertical direction Z is directed along the deflecting unit 5 to the filling space 22 in the component 20, whereby the area provided with the undercut 21 will be filled with the filler 10.

A cleaning device 11, by which the deflecting unit 5 can be cleaned after the conclusion of a filling cycle, is situated adjacent to the outlet tube 4. In the present embodiment, the surface is acted upon by a solvent under pressure, whereby residue of the adhering filler 10 can be removed from the surface 13 of the deflecting unit 5. According to the invention, cleaning can therefore take place without having to disassemble the deflecting unit 5 from the filling device 1.

As an alternative, other arrangements of the adjusting device 6, of the servo motor 7 or of the cleaning device 11, as well as of further components, on which the invention is based, may also be combined. The adjusting device 6 may therefore particularly also have a rotational drive, which permits a rotation about the angle of rotation θ about the axis in the vertical direction Z, whereby a (graduated)-circle-shaped rotating movement of the deflecting unit 5 will be permitted.

Furthermore, the outlet tube 4 itself may have a movable design and the direction of flow can be adjusted directly already by way of the orientation of the outlet tube 4. As an alternative, a combination of the adjustable outlet tube 4 and the adjusting device 6 may be provided in order to obtain a large number of degrees of freedom. For this purpose, the outlet tube 4 is to be provided with an adjusting drive in order to orient and move the latter into the desired direction.

Additionally, the outlet tube 4 may also have a flexible design, so that curves and curvatures of the outlet tube 4 can be adjusted.

LIST OF REFERENCE SYMBOLS

1 Filling device
2 Mixing head
3 Operating unit
4 Outlet tube
5 Deflecting unit
6 Adjusting device
7 Servo motor
10 Flowable filler material
11 Cleaning device
12 Feeding pipes
13 Surface of the deflecting unit
14 Anti-adhesion unit
Z Vertical direction
α Polar coordinates (angle coordinates)
F, F', F'', F''' Spatial directions (directions of flow)

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A filling device for at least one of wetting or filling a component having an undercut space, the filling device comprising:
   a mixing head operatively configured to mix a flowable curable filler;
   an outlet tube coupled with the mixing head, the outlet tube feeding the flowable filler into a filling space of the component;
   an adjustable deflecting unit operatively configured to change a direction of flow of the flowable filler fed from the outlet tube, wherein the flowable filler emerging from the outlet tube is deflectable into an intended direction of flow; and
   an adjusting device that is coupled at a first end thereof to the mixing head and at second end thereof to the adjustable deflecting unit, the adjusting device being operatively configured to adjust an orientation of the adjustable deflecting unit in one or more spatial directions.

2. The filling device according to claim 1, wherein the adjustable deflecting unit is arranged below the outlet tube.

3. The filling device according to claim 1, wherein the adjusting device is configured to at least one of rotate or swivel the adjustable deflecting unit about an angle.

4. The filling device according to claim 3, wherein the adjusting device comprises at least one servo motor.

5. The filling device according to claim 4, wherein the adjustable deflecting unit has an anti-adhesion layer formed on a surface layer thereof, the anti-adhesion layer having an anti-adhesion effect with respect to the flowable filler.

6. The filling device according to claim 5, wherein the filling device is adapted to use a flowable PUR foam as the flowable filler.

7. The filling device according to claim 6, wherein the anti-adhesion layer on the adjustable deflecting unit is a synthetic fluoropolymer or PP layer.

8. The filling device according to claim 1, wherein the adjustable deflecting unit has an anti-adhesion layer formed on a surface layer thereof, the anti-adhesion layer having an anti-adhesion effect with respect to the flowable filler.

9. The filling device according to claim 1, wherein the filling device is adapted to use a flowable PUR foam as the flowable filler.

10. The filling device according to claim 9, wherein the anti-adhesion layer on the adjustable deflecting unit is a synthetic fluoropolymer or PP layer.

11. A method of filling a component having an undercut space with a flowable filler, the method comprising the acts of:
    a) providing a component with the undercut space to be filled with the flowable filler, the flowable filler being a flowable curable filler;

b) feeding the flowable curable filler to the undercut space of the component through an outlet tube of a filling device, the filling device comprising:
  a mixing head operatively configured to mix a flowable curable filler;
  an outlet tube coupled with the mixing head, the outlet tube feeding the flowable filler into a filling space of the component;
  an adjustable deflecting unit operatively configured to change a direction of flow of the flowable filler fed from the outlet tube, wherein the flowable filler emerging from the outlet tube is deflectable into an intended direction of flow; and
c) adjusting the adjustable deflecting unit before and/or during the filling of the undercut space of the component so that the flowable curable filler flowing out of the outlet tube is directed in a direction of flow by the adjustable deflecting unit in order to reach and fill the undercut area, wherein
  the act of adjusting the adjustable deflecting unit is carried out via an adjusting device that is coupled at a first end thereof to the mixing head and at second end thereof to the adjustable deflecting unit, the adjusting device comprising a servo motor coupled with the deflecting unit, the servo motor adjusting an orientation of the deflecting unit.

* * * * *